Feb. 20, 1973 C. R. MURRAY ET AL 3,717,831
TRANSFORMER HAVING SERIES-MULTIPLE WINDINGS
Filed July 26, 1971

United States Patent Office 3,717,831
Patented Feb. 20, 1973

3,717,831
TRANSFORMER HAVING SERIES-MULTIPLE WINDINGS
Charles R. Murray and Robert L. Plaster, South Boston, Va., assignors to Westinghouse Electric Corporation, Pittsburgh, Pa.
Filed July 26, 1971, Ser. No. 166,232
Int. Cl. H01f 29/02, 33/00
U.S. Cl. 336—5                                                    1 Claim

ABSTRACT OF THE DISCLOSURE

Transformer apparatus wherein a winding thereof may be connected in different arrangements to change the voltage rating of the transformer. The winding consists of three sections which are wound concentrically around a magnetic core. Two sections of the winding are connected in series to provide one of the voltage ratings. When the other voltage rating is desired, the third winding section is interconnected to provide a voltage rating equal to the sum of all the winding sections.

BACKGROUND OF THE INVENTION

Field of the invention

This invention relates, in general, to electrical inductive apparatus and, more specifically, to concentrically wound transformer coils which may be alternately connected to provide different voltage ratings while maintaining substantially constant winding impedance.

Description of the prior art

Many electrical power utility companies are in the process of increasing the voltage on their transmission and distribution lines to help meet the ever increasing electrical load requirements. Existing medium size power transforms, such as power center transformers, will need to be replaced when the higher distribution voltages become available. The interim time period between the presently available and proposed distribution voltages poses economic problems for new or replacement transformers being put into use at the present time. If the transformer is constructed for the present distribution voltages, it will be obsolete when the higher voltages are a reality.

To alleviate this situation, transformers with multiple windings thereon are being produced in which the windings can be arranged to operate satisfactorily at the lower distribution voltage and can be rearranged to operate satisfactorily at a predetermined higher distribution voltage. Present series-multiple transformers are constructed by positioning the winding sections axially around the magnetic core of the transformer. This arrangement requires that insulating spacers be used between the winding sections and that the number of sections be equal to the ratio of the two voltage ratings desired. When tap changing equipment is used, separate tap changers are required for each section of the winding since they are all connected in parallel to provide the lower voltage rating.

It is therefore desirable, and it is an object of this invention, to provide a series-multiple transformer which can be constructed with only three high voltage winding sections regardless of the ratio of the desired voltage ratings and in which the change from one rating to the other can be made without significantly affecting the impedance of the winding. It is another object of this invention to provide an arrangement wherein the windings may be tapped without the use of more than two tap changers.

SUMMARY OF THE INVENTION

There has been disclosed a new and useful arrangement for constructing a series-multiple power transformer. Three high voltage winding sections are concentrically disposed around the low voltage winding and the magnetic core. For the lower voltage rating of the high voltage winding, two of the winding sections are serially interconnected. For the higher voltage rating of the high voltage winding, the same two winding sections plus the middle high voltage winding section are all connected in series. Because of the concentric arrangement of these windings, and the middle position of the "floating" winding when connected for the lower voltage rating, the impedance of the high voltage winding remains substantially constant when changing from one rating to the other. Since the ratio of the voltage ratings can be governed by the ratio of the three winding sections only, additional winding sections are unnecessary. This results in a manufacturing savings and reduces the tap changing equipment necessary when tap changing of the high voltage winding is desired.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
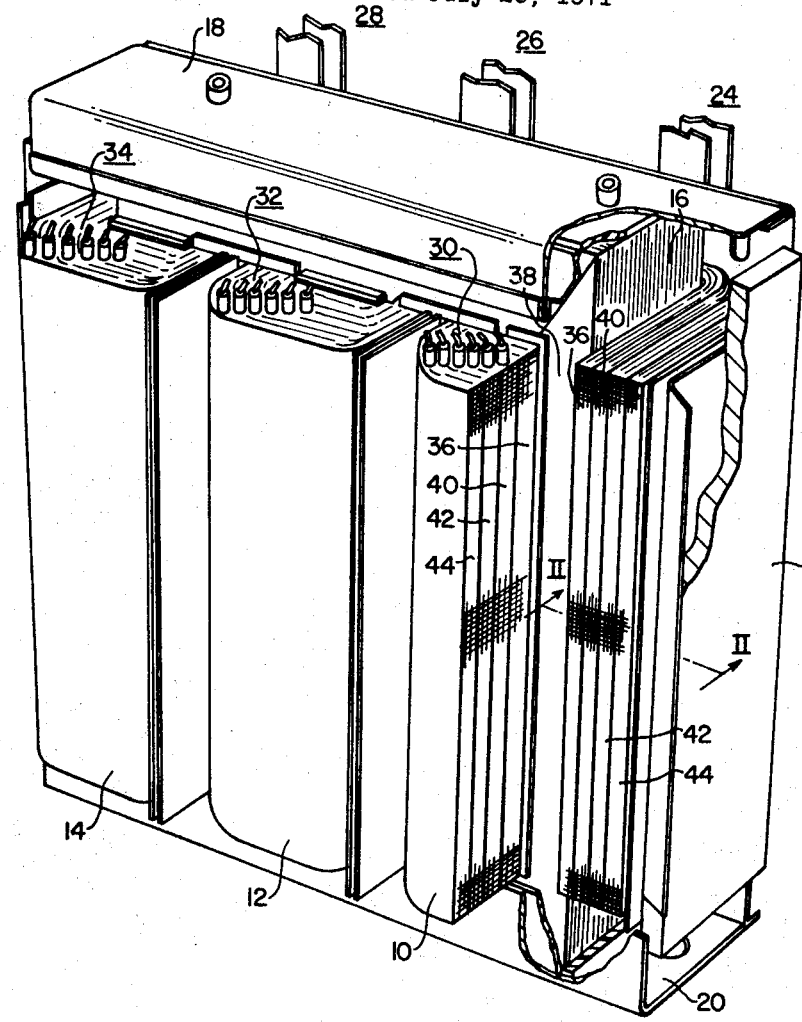
FIG. 1 is a view of a three-phase power transformer constructed according to the teachings of this invention with parts broken away for clarity.

Throughout the following description, similar reference characters refer to similar members in all figures of the drawings.

Referring now to the drawings, and FIG. 1 in particular, there is shown a three-phase transformer, with portions thereof cut-away for clarity, constructed according to the teachings of this invention. The transformer includes the phase windings 10, 12 and 14 which are disposed on the legs of a laminated magnetic core 16. The winding and core assembly is rigidly held in position by the top support 18, the bottom support 20, and side braces, such as the brace 22. Each of the phase windings 10, 12 and 14 has a low voltage winding with the low voltage lead pairs 24, 26 and 28 attached thereto, respectively. High voltage lead groups 30, 32 and 34 are connected to the high voltage windings of the phase windings 10, 12 and 14, respectively.

Figures 2, 3, 4, 5:
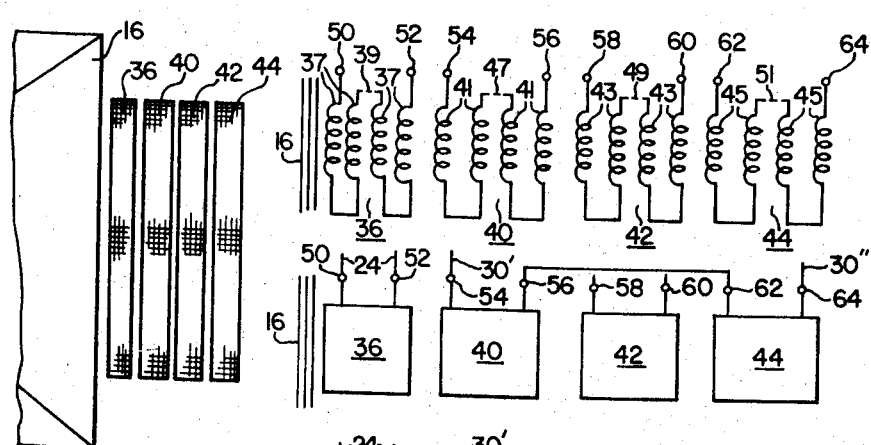
FIG. 2 is a partial sectional view of the winding structures taken along the line II—II shown in FIG. 1.
FIG. 3 is an electrical schematic of the winding structures of a transformer constructed according to the teachings of this invention.
FIG. 4 is a schematic diagram illustrating the interconnecting arrangements for providing the lower voltage rating.
FIG. 5 is a schematic diagram illustrating the interconnecting arrangements for providing the higher voltage rating.

Details of the phase winding 10 are illustrated by the cut-away portion of FIG. 1. A low voltage winding 36 is disposed in close proximity with the leg 38 of the magnetic core 16. High voltage winding sections 40, 42 and 44 are disposed concentrically around the low voltage winding 36. The lead group 30 provides means for connecting the high voltage windings 40, 42 and 44 to a tap changing mechanism or to a terminal board arrangement so that the leads may be connected differently, in relation to each other, to provide difference high voltage winding ratings. The physical arrangement of the phase winding 10 is shown in FIG. 2, which is a partial cross-sectional view taken along the line II—II of FIG. 1. The low voltage winding 36 is positioned nearest to the mangetic core 16. The high voltage winding section 40 is adjacent to the low voltage winding 36. The high voltage winding section 44 forms the outermost winding of the phase winding 10 and the winding section 42 is disposed between the high voltage winding sections 40 and 44.

The electrical equivalent of the structure shown in FIG. 2 illustrated schematically in FIG. 3. The low voltage winding section 36 comprises the coils 37 which may be wound of sheet conductors, strap conductors, or any other suitably shaped members. The dashed line 39 indicates that a plurality of coils may be interconnected to form the winding section 36. The coils 37 are connected to the low voltage terminals 50 and 52. The high voltage winding section 40 comprises the coils 41 which are connected to the terminals 54 and 56, with the dashed line 47 indicating that additional coils may comprise the high voltage winding section 40. The high voltage winding section 42 comprises the coils 43 which are connected to the terminals 58 and 60, with the dashed line 49 indicating that additional coils may comprise the high voltage winding section 42. The high voltage winding section 44 comprises the coils 45 which are connected to the terminals 62 and 64, with the dashed line 51 indicating that additional coils may comprise the high voltage winding section 44. The high voltage winding sections 40, 42 and 44 may also be wound of sheet conductors, strap conductors, or any other suitably shaped members.

FIG. 4 represents a block schematic diagram of the electrical connections between the winding sections used to provide the first rated voltage of the transformer. The low voltage lead pairs 24 are connected to the terminals 50 and 52. Leads of the lead group 30 are connected to the terminals of the high voltage winding sections 40, 42 and 44. The high voltage winding sections 40 and 44 are effectively connected in series, with the winding leads 30' and 30" providing the connecting means for the high voltage winding. The high voltage winding section 42 is effectively "floating" and not a part of the high voltage winding system providing the rated voltage by these connections. The high voltage winding sections 40 and 44 each have a voltage rating which is one-half of the first voltage rating of the transformer.

FIG. 5 shows the connections between the winding sections to provide the second rated voltage of the transformer. The high voltage winding sections 40, 42 and 44 are all connected in series, with the winding leads 30' and 30" providing the connecting means for the high voltage winding. The voltage rating of the high voltage winding section 42 is an appropriate value to make the total voltage from all three high voltage winding sections equal to the desired second voltage rating.

For example, it may be desirable to provide a transformer which can be used a high voltage rating of 2400 volts for present use and which could be conveniently modified or switched to provide a high voltage rating of 7200 volts. The high voltage winding sections 40 and 44 would each have a rating of 1200 volts. The high voltage winding section 42 would have a rating of 4800 volts. Thus, with the connections shown in FIG. 4, the rated voltage would be 2400 volts and with the connections shown in FIG. 5, the rated voltage would be 7200 volts. To reduce the voltage developed on the high voltage winding section 42 when it is "floating," means may be used to split the winding section 42 into two or more sections. It is within the contemplation of this invention that, if more than two high voltage ratings are desired, additional winding sections, on each side of the middle winding section, may be used.

It should be emphasized that the new and useful apparatus disclosed herein provides approximately the same impedance when operating at the first rating (FIG. 4) and when operating at the second rating (FIG. 5). This can only be realized by the energized and floating concentrically wound windings taught by this invention. Axially disposed high voltage winding sections would provide drastic impedance changes between connecting arrangements which use all of the high voltage winding sections and connecting arrangements which produce a floating winding section. Thus, the invention disclosed herein permits the construction of a dual rated transformer which can be conveniently changed from one rating to the other without significantly changing the impedance thereof.

Axially disposed high voltage winding sections, as used in the prior art, usually require more winding sections than the three required by the invention disclosed herein. For example, to provide a series-multiple transformer with a first high voltage rating of 2400 volts and a second high voltage rating of 14,400 volts, six high voltage winding sections would be required by the prior art concept. That is, the windings which are each rated at 2400 volts may all be connected in parallel to provide 2400 volts, or they may all be connected in series to provide 14,400 volts. According to this invention, only three winding sections would be required; two sections rated at 1200 volts and one section rated at 12,000 volts.

Tap changing equipment is frequently associated with the high voltage windings of power transformers. Since the prior art arrangement connects all of the high voltage winding sections in parallel to provide the lower high voltage rating, separate taps and tap changers would be required for each high voltage winding section. With the arrangement taught by this invention, since the winding sections are only connected in series, only two tap changers would be required.

There has been disclosed a dual high voltage power transformer which may be conveniently modified to provide either voltage rating without any significant impedance change. Only three windings are required, regardless of the ratio of the two rated voltages and tap changing equipment is substantially reduced. The insulation structures between axially positioned high voltage winding sections are automatically eliminated by this invention. Since numerous changes may be made in the above-described apparatus and different embodiments of the invention may be made without departing from the spirit thereof, it is intended that all of the matter contained in the foregoing description or shown in the accompanying drawings shall be interpreted as illustrative rather than limiting.

We claim as our invention:

1. A three phase series-multiple transformer comprising a laminated magnetic core having three legs, phase winding structures disposed on each of said legs, each of said phase winding structures comprising an output winding concentrially disposed around one of said legs, a first high voltage winding section concentrically disposed around said output winding and having a first voltage rating, a second high voltage winding section concentrically disposed around said first high voltage winding section and having a second voltage rating which is greater than said first voltage rating, a third winding section concentrically disposed around said second winding section and having a voltage rating substantially equal to said first voltage rating, means for providing a first connecting arrangement wherein only said first and third winding sections which are disposed on the same core leg are interconnected to provide a single winding having a voltage rating substantially equal to twice the first voltage rating and said second winding section is not connected to said first and third winding sections, means for providing a second connecting arrangement wherein said second winding section is connected in series circuit relationship with said first and third winding sections to provide a single winding having a voltage rating substantially equal to the sum of the voltage ratings of each of said first, second and third winding sections.

References Cited

UNITED STATES PATENTS

| | | | |
|---|---|---|---|
| 729,748 | 6/1903 | Frank | 336—182 |
| 1,872,369 | 8/1932 | Van Sickle | 336—180 X |
| 1,935,419 | 11/1933 | Palley | 323—48 X |
| 3,144,628 | 8/1964 | Rabins | 336—147 X |
| 1,928,848 | 10/1933 | Crout | 336—12 X |
| 2,987,689 | 6/1961 | Doucette, Jr. | 336—182 X |

THOMAS J. KOZMA, Primary Examiner

U.S. Cl. X.R.

323—48; 336—146, 182